Sept. 20, 1966  R. P. KIDWELL  3,273,336
APPARATUS FOR CONTROLLING CONDUCTIVE FLUIDS
Filed May 29, 1961  3 Sheets-Sheet 1
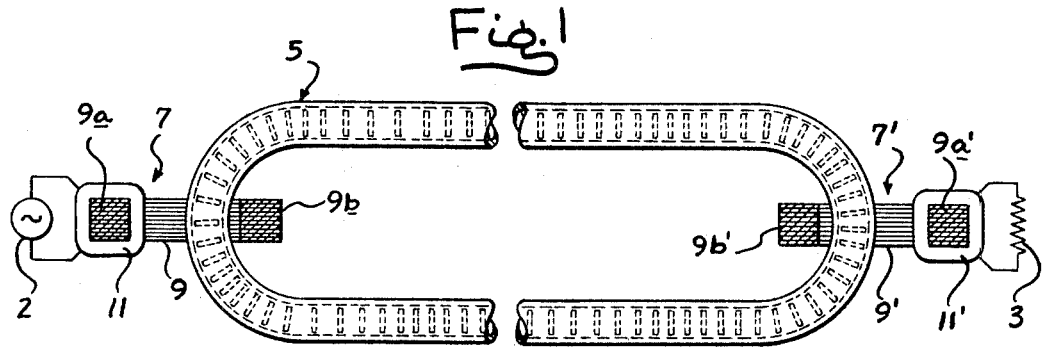
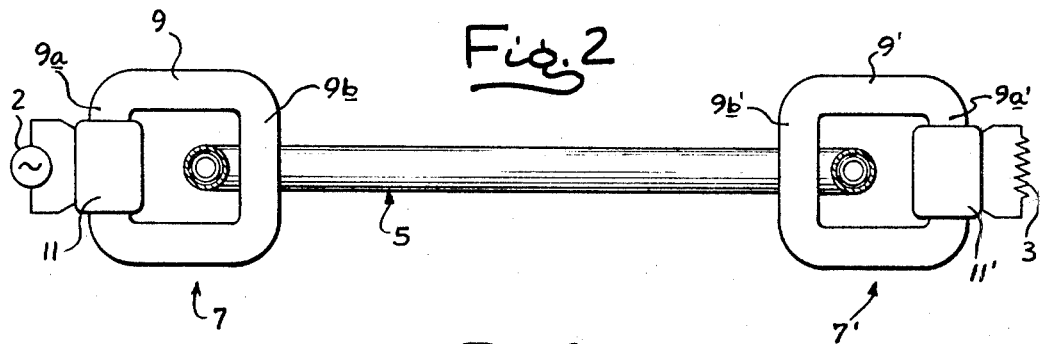
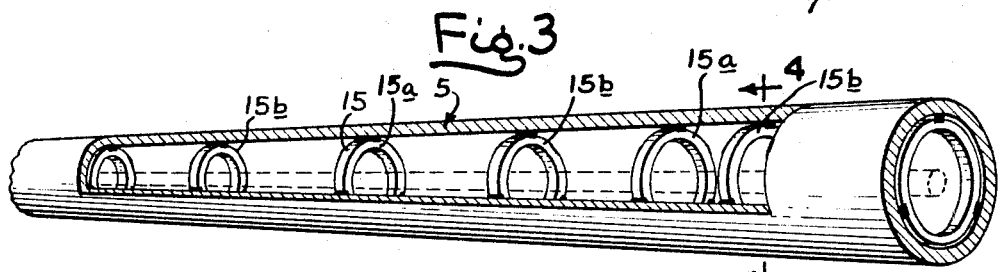
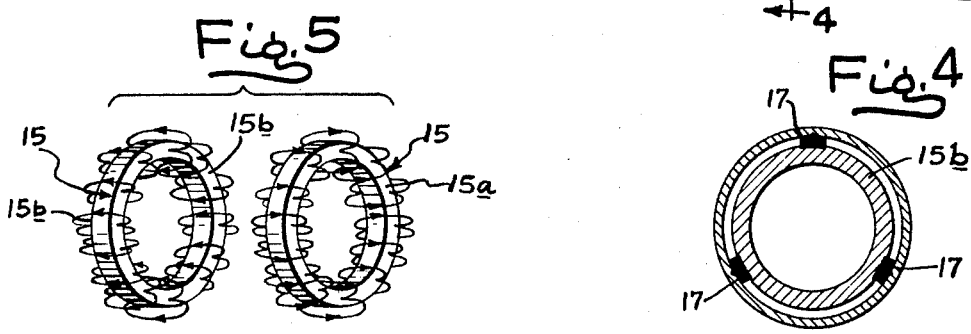
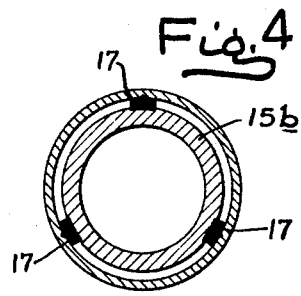
INVENTOR
ROBERT P. KIDWELL
by: Wallenstein, Spangenberg & Hattis
ATTYS.

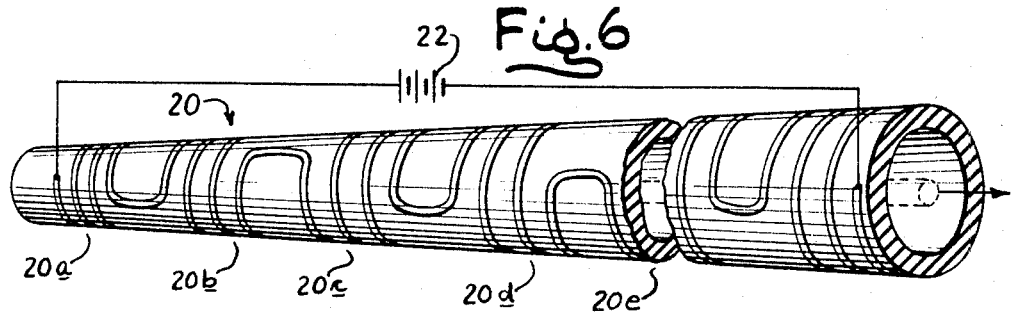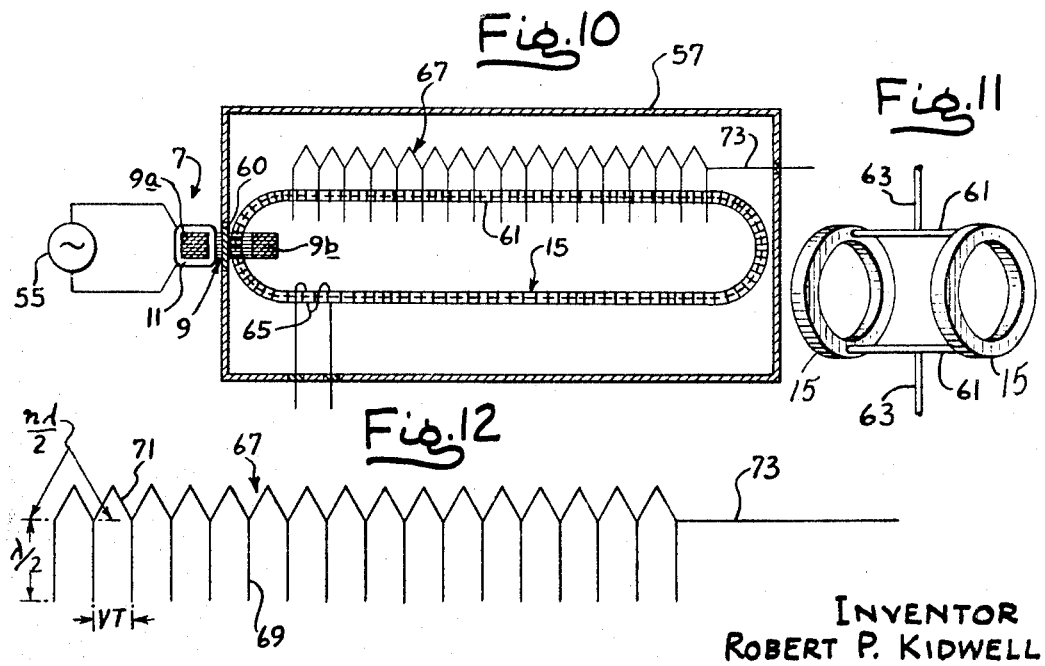

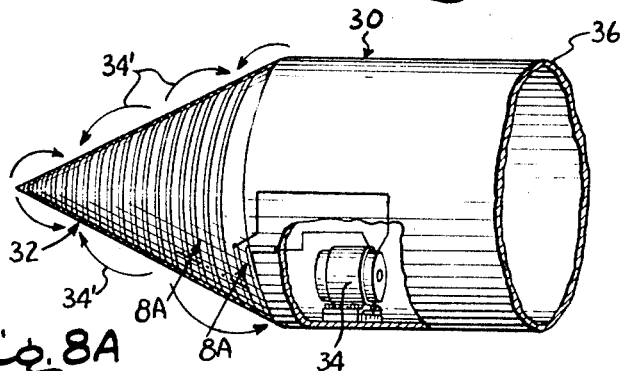
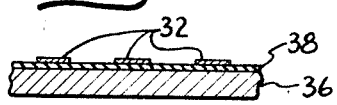
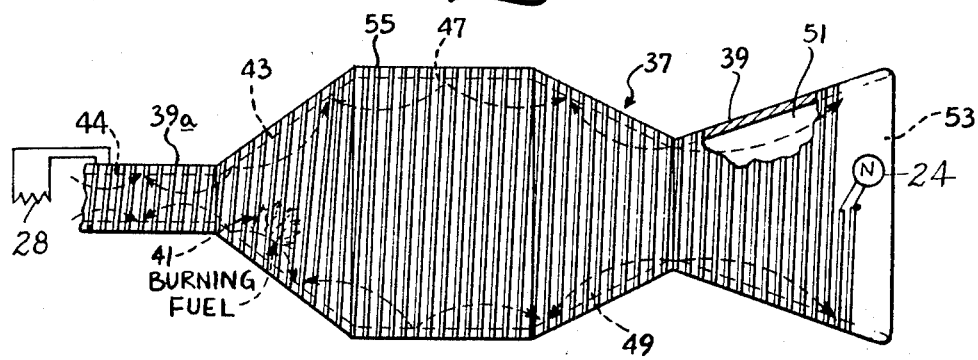
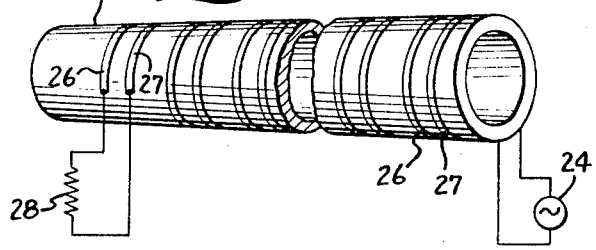

United States Patent Office 3,273,336
Patented Sept. 20, 1966

3,273,336
APPARATUS FOR CONTROLLING CONDUCTIVE FLUIDS
Robert P. Kidwell, 2213 Calle de Suenos, Las Cruces, N. Mex.
Filed May 29, 1961, Ser. No. 113,443
11 Claims. (Cl. 60—35.6)

The present invention relates to apparatus for confining or otherwise manipulating various fluids including electronic plasmas, ionized gases, and other conductive or ionized fluids.

One of the objects of the invention is to provide a simple and efficient means for controlling the path of movement of various conductive fluids. Another object of the invention is to provide a means wherein electronic plasmas or other conductive fluids can be confined to restricted areas within conductors or large enclosures by purely nonmechanical means.

Still another object of the invention is to minimize or prevent contact of a conductive fluid and the walls of a conduit or other solid body adjacent to or containing the fluid. A related object of the invention is to provide a means for confining highly corrosive or other fluids to the center portion of a conduit carrying the same to prevent damage to the conduit, contamination of the fluid and to minimize frictional drag. A still further related object of the invention is to minimize air resistance or drag between a rocket, missile or other vehicle moving in the atmosphere.

Another object of the invention is to provide a means for controlling the path of flow of the combustion products of a rocket motor between the combustion chamber and the discharge orifice thereof.

Still another object of the invention is to provide a means for efficiently transmitting electrical energy by a plasma stream confined to flow in a very limited area within a conduit, and to provide a means for coupling energy to and from the plasma stream.

An all encompassing object of the present invention is to provide apparatus for satisfying the aforesaid objectives and which is of simple and uncritical construction, can be economically fabricated and assembled on a mass production basis, and has a long service life under harsh and diverse conditions.

In accordance with one of the aspects of the invention, it has been discovered that various conductive fluids can be readily and efficiently confined to a predetermined path by effecting a unique interaction between the conductive fluids and a magnetic field which comprises a series of magnetic field sections which alternate in direction along the path. In one form of the invention, the magnetic field is produced by a series of spaced rings of permanently magnetized material whose transverse axes fall along the desired path of flow of the conducting fluid. Each of the rings has one of its magnetic poles along one axially facing side thereof and the opposite magnetic pole along the opposite axially facing side thereof. Each magnetic ring produces a doughnut-shaped field pattern. The rings are positioned in longitudinally spaced opposed relationship so that the confronting axially facing sides of adjacent rings have the same magnetic pole. This arrangement produces an overall magnetic field pattern comprising successive magnetic field sections which alternate in a direction along the desired path of fluid flow. The resulting axial and radial magnetic lines of force alternating in direction along the path confines both positive, negative and even neutral particles of the fluid flowing within the doughnut-shaped field pattern to the central region of the pattern. A conductive fluid flowing outside of the magnetic field pattern will be impelled away from the pattern.

The rings of magnetic material may be mounted inside of a conduit carrying the conductive fluid involved and by confining the fluid flow to a path within the rings can prevent contact between the walls of the conduit and the fluid. The rings could also accomplish this result when placed outside of the conduit provided the confining force is sufficient to prevent contact with the conduit walls within the rings.

By placing the rings on the outside of a vehicle which is to be impelled through a conductive fluid, contact between the vehicle and the fluid can be prevented or minimized to reduce frictional drag.

An alternating doughnut-shaped magnetic field pattern as above described can also be obtained using electromagnet elements. Thus, a conductor wound around a conduit in alternating directions and connected to a direct current voltage source will produce a magnetic field pattern similar to that produced by the magnetic rings.

It has been discovered that the most effective operation of the present invention is achieved when there is relatively rapid motion between the conductive fluid and the magnetic field pattern referred to. A relatively rapid motion between the conductive fluid and the magnetic field is also effective to induce electric fields of sufficient magnitude to ionize many relatively non-conductive fluids to convert the same into relatively conductive fluids which can be manipulated by the present invention.

In accordance with another aspect of the invention, the relatively rapid motion between the conductive fluid and the magnetic field is obtained by imparting movement to the magnetic field pattern. One way of accomplishing this is by generating a traveling magnetic wave by energizing one or more helical windings which wind in only one direction by a source of alternating current having a frequency with a wave length which is small relative to the lineal length of the conductors forming the helical windings.

Other features and advantages of the invention will become apparent upon making reference to the specification to follow, the claims and the drawings wherein:

FIG. 1 is a plan view, partially in section, of an electrical power transmission system utilizing the present invention;

FIG. 2 is an elevational view of the embodiment shown in FIG. 1;

FIG. 3 is a perspective view, partially broken away, of a portion of the apparatus of FIG. 2 showing the fluid confining magnetic rings constituting one form of the present invention;

FIG. 4 is an enlarged transverse sectional view, taken substantially along section line 4—4 in FIG. 3;

FIG. 5 is a perspective view showing the magnetic lines of force of a pair of contiguous magnetic rings in the apparatus of FIGS. 1 through 4;

FIG. 6 is a modified form of the invention using electromagnets instead of permanent magnets;

FIG. 7 is another form of the invention which produces a traveling magnetic field pattern;

FIG. 8 shows a perspective view of the nose of a missile which incorporates features of the present invention reduce frictional drag and FIG. 8A is a section through FIG. 8;

FIG. 9 is a fragmentary view of a reaction motor in which the invention is incorporated to confine the combustion gases as they move toward the discharge orifice of the motor;

FIG. 10 is a sectional view through a still further modified view of the invention where high frequency energy is obtained from a flowing plasma stream confined by the magnetic rings shown in FIGS. 1 through 5;

FIG. 11 is a perspective view of a pair of rings forming part of the apparatus shown in FIG. 10; and FIG. 12 is an enlarged view of the high frequency coupling unit forming part of the apparatus shown in FIG. 10.

Referring now to FIGS. 1 through 5, there is there shown one exemplary form of the present invention applied as a power transmission system which transmits electrical power from a generator 2 to a load indicated by a resistor 3. Instead of using electric cables for power transmissions this form of the invention utilizes a stream of electronic plasma confined to a small area in the center of a conduit 5 made of metal or an insulating material. As is well known, electronic plasma consists of highly ionized gases which comprise a mixture of electrons and ions forming an extremely good conductor of electricity. Normally, such plasma is heated to a high temperature to maintain substantial ionization of the gas. It will be assumed that the plasma is heated and maintained at the high temperature required by any suitable means.

The conduit 5 is in the form of a continuous elongated loop. The energy from the generator 2 is coupled into the flowing plasma stream in the conduit 5 by a more or less conventional transformer unit generally indicated by reference numeral 7. This transformer has a core 9 made of magnetic material having a leg 9a around which primary windings 11 are wound and a leg 9b around which one end of the elongated conduit 5 passes to constitute a secondary winding. The generator 2 is connected to the opposite ends of the primary winding 11 and the magnetic flux generated in the core 9 is coupled to the plasma within the conduit 5 to induce an alternating electrical field which imparts back and forth movement to the electrical particles within the plasma, effectively to generate an electrical current analogous to the generation of a current in a wire. In a similar way, the energy within the flowing plasma stream may be coupled therefrom by an output transformer 7' including a core 9' with legs 9a' and 9b'. The conduit 5 loops around the leg 9b' to constitute a primary winding of a transformer. A winding 11' winds around the leg 9a' to constitute a secondary winding of the transformer and a load resistor 3 is connected across the ends of the winding 11'.

One of the important aspects of the present invention is the manner in which the plasma is confined within the central portion of the conduit 5 as a continuous stream, so that the stream does not strike the walls of the conduit 5 and the diameter of the plasma stream remains fairly constant. Where undesired resonant conditions build up in the plasma stream, the diameter thereof can vary widely in diameter and perhaps build up to a maximum diameter where is would strike the conduit walls or become so small as to cause a discontinuity in the plasma stream, which adversely affect the efficiency of energy transmission and cause corrosion of the conduit walls.

In the particular form of the invention shown in FIGS. 1 through 5, the means for confining the plasma flow within the conduit 5 comprise a series of permanent magnet rings generally indicated by reference numeral 15. As illustrated, the conduit 5 has a cylindrical cross section and the ring magnets 15 are of a diameter somewhat less than the inside diameter of the conduit 5. The rings are supported within the conduit by spacer members 17 which may be adhesively or otherwise secured between the walls of the conduit and the ring magnets.

As shown most clearly in FIG. 3, each of the ring magnets has one of its poles extending along one of its axially facing sides 15a and the opposite pole extending along the opposite axially facing side 15b. The magnetic field pattern of each of the ring magnets is shown by the arrows in FIG. 5 and is similar in shape to a doughnut. In accordance with one important aspect of the present invention, the ring magnets are positioned in coaxial alignment within the conduit 5 and in alternating opposed relation so that the north pole side of a given ring magnet will face the north pole side of the adjacent magnet and the south pole side of any ring magnet will face the south pole side of the adjacent ring magnet. With such an arrangement, the direction of the lines of force of adjacent magnets oppose rather than reinforce one another. In effect, the integrity of the magnetic field of each of the ring magnets is maintained so that a magnetic field pattern is provided within the conduit 5 which alternates in directions along the conduit. The magnetic field pattern comprises the individual pattern elements contributed by each ring magnet, which extends generally axially within the ring and generally radially at points between the contiguous ring magnets.

The alternating magnetic field pattern described enables the invention to influence and thereby confine moving positively charged elemental particles, moving negatively charged elemental particles and even moving neutrally charged elemental particles carried along with the rest of the plasma stream. In the case of uncharged elemental particles, a displacement current or charge is usually induced therein by the varying magnetic field linking the same which enables such particles to be affected by the magnetic field.

When the ring magnets are spaced in a regular manner, it is possible for a resonant interaction to occur between the field and the moving plasma which causes wide variation in the diameter of the plasma stream. To minimize this condition, the ring magnets are spaced in an irregular manner along the conduit 5. That is to say, the spacing of these magnets varies and the spacing between the maximum and minimum spacing points varies so that an irregular spacing and pattern results.

FIG. 6 shows a modification of the form of the invention shown in FIGS. 1 through 5 wherein the permanent magnet rings 15 are replaced by electromagnet means generally indicated by reference numeral 20. As illustrated, the electromagnet means comprises a series of helical conductor winding sections 20a, 20b, 20c, 20d, etc. connected in series and positioned in the same irregular manner referred to above. These winding sections thus respectively take the place of and are positioned approximately like the ring magnets 15. The directions in which the helical winding sections 20a, 20b, 20c, etc. extend around the conduit 5 alternate so that an alternating magnetic field pattern results like that previously described. The helical winding sections may constitute actual windings of wire anchored in place within or without the conduit 5 or may be circuit conductors printed on the conduit 5 where the conduit is made of an insulating material. A source 22 of D.C. current is connected across the ends of the series connected helical winding sections.

In the forms of the invention shown in FIGS. 1 through 6, it is apparent that the magnetic field pattern is stationary and that the electronic plasma is accelerated around the conduit loop by a voltage induced therein from the transformer 7.

As previously indicated, the ability of the magnetic field to confine the plasma (or other conductive medium) is a function of the relative velocity between the plasma and the magnetic field in terms of the number of field reversals traversed by the plasma particle and the field strength. A large field strength requires a smaller relative velocity and a small field strength requires a large relative velocity for a given result. For example, if with a field strength of 1000 gauss good results are obtained if the plasma particles are subjected to $10^5$ field reversals per second, similar results will be achieved with a field strength of 100 gauss at $10^6$ field reversals per second. In some instances where this relative velocity is not very substantial using a stationary magnetic field pattern, it is extremely helpful to create a moving magnetic field pattern. In the embodiment of the invention shown in FIGS. 1 through 5, the direction of movement of the plasma alternates each half cycle. In this application of the invention, therefore, for maximum effectiveness it would be necessary to change the direction of the traveling magnetic field each half cycle to keep the field moving opposite to the direction of movement of the plasma stream. However, where the velocity of movement of the plasma is small relative to the velocity of the traveling magnetic field, the direction of movement of the field is unimportant. There are many applications, however, when the plasma or other ionized medium involved is either stationary or else has a consistent direction. Such applications involve situations where the plasma or other conductive fluid is caused to move in a fixed direction by an external pumping force or where a missile is caused to move through the ionized particles in the atmosphere. In such case, the magnetic field pattern need be moved in only one direction for maximum effectiveness. FIGS. 7 shows a way in which a magnetic field pattern can be advanced in one direction.

The embodiment of FIG. 7 uses a more or less conventional form of transmission line wound around the conduit 5' to provide a traveling magnetic field pattern. The transmission line comprises a pair of conductive wires 26-27 wound together around the conduit. One of the ends of the conductors is connected across the output terminals of a source of alternating voltage 24 having a frequency with a wave length many times smaller than the lineal length of the winding, wherein the direction of current flow in the lie will reverse each half wave length along the conductor forming winding 23, and wherein, at any instant, there will be an alternating doughnut-like field pattern along the line similar to that obtained in the static magnetic field embodiments of FIGS. 1 through 6. The various half wave length sections of the line are thus spaced in an irregular manner. The other of the line is connected across a suitable terminating (characteristic) impedance 28 which prevent reflections at the ends of the transmission line, so that a traveling wave comprising successive doughnut-like magnetic fields sections of reversing direction proceeds away from the generator end of the transmission line. The magnetic field pattern in the arrangement shown in FIG. 7 will, therefore, travel from right to left.

Two important applications of the traveling wave magnetic field embodiment of the present invention are shown in FIGS. 8 and 9 now to be described. FIG. 8 shows a fragmentary view of the head or nose portion of a missile generally indicated by reference numeral 30. In accordance with this aspect of the invention, the nose portion of the missile 30 has a helical transmission line 32 like that shown in FIG. 7 applied thereto. The line is energized by a suitable alternating voltage generator 34 and terminated by a characteristic impedance (not shown) to provide a traveling magnetic field pattern moving toward the pointed end of the nose of the missile which repels ionized or displacement charge carrying particles from the nose of the missile. The resulting magnetic field pattern alternates in a direction as indicated by the arrows 34'. The resulting forward movement of the magnetic field pattern will increase the relative speed between the magnetic field pattern and the atmosphere particles surrounding the nose of the missile and effect increased ionization of the surrounding atmosphere to maximize the force repelling the atmosphere particles and minimize frictional drag.

The helical transmission line 32 may be applied to the nose of the missile in any suitable way. As shown by the sectional view through the missile nose, the main body of the missile may comprise a suitable metal 36 overlayed with a shell of insulating material 38 upon which is printed or otherwise applied the helical winding 32.

Refer now to FIG. 9 which shows the application of the invention to a reaction motor 37. The reaction motor has a shell 39 varying in cross section. A burner unit 41 is located in a tapered combustion chamber 43. Gases are delivered to the burner chamber through a narrow inlet section 44 of the shell 39. The tapered chamber 43 merges with a larger chamber 47 of constant cross section and this chamber joins a tapering chamber 49 which joins an outwardly flaring discharge chamber 51 terminating in a discharge orifice 53. The burning gases are directed out of the discharge orifice 53 to effect the propulsion of the rocket motor. A pair of helical windings 55-55' forming a helically wound transmission line as in FIG. 7 is energized by alternating voltage source 24 connected to the rear ends of the windings 55-55' and carried by the motor is applied about the shell 39 in a manner similar to that used to energize the windings 26 and 27 in FIG. 7 to provide a magnetic field pattern moving in a direction opposite to the direction of flow of the burning gases within the motor 37, namely away from the discharge orifice 53. The front ends of the windings 55-55' are connected to a characteristic impedance 28 for the transmission line. The magnetic field pattern which is an alternating magnetic field pattern similar to that previously described, ionizes as well as confines the burning gases to the central region of the various chambers referred to, so that there is little or no contact between the gases and the walls of the shell 39.

In the various forms of the invention above described, the magnetic field producing elements follow the contour of the associated conduits 5 and 5', etc. The present invention, however, is also applicable to a situation where the magnetic field producing elements do not follow the contour of a conduit, but follow an independent path within a much larger housing, as in the form of the invention shown in FIG. 10. The application of the invention illustrated therein is one for converting the output of an alternating voltage generator 55 at one frequency to a substantially higher frequency through the medium of a flowing body of ionized gas caused to traverse a continuous loop path located within an isolating housing or chamber 57. The chamber 57 may contain ionized hydrogen at a very low pressure. The output of the generator 55 is fed to the primary winding 11 wound on a core 9 of magnetic material forming part of a transformer 7 similar to the transformer described in connection with the embodiment of FIGS. 1 and 2. The core 9 has a pair of parallel legs 9a and 9b located on opposite sides of a wall of the chamber 57. The legs of the core bridging the ends of the legs 9a and 9b extend through isolating gaskets 60 in the chamber 57 to maintain a low pressure therein.

A series of ring magnets 15 are arranged together to form a continuous loop as in the form of the invention illustrated in FIGS. 1 and 2, one end of the loop extending around the leg 9b of the core 9 of the transformer 7. As above indicated, the ring magnets 15 in this form of the invention do not follow the contour of the chamber 57. The ring magnets 15 are held together by struts 61 (FIG. 11) to form an integral structure which in turn is suspended in any suitable way within the central portion of the chamber 57. For example, the ring magnets may be supported by insulating rods 63 secured to the walls of the chamber 57.

The hydrogen within the housing 57 may be initially ionized by a heater coil 65 or the like in the manner commonly used to ionize the gas in fluorescent light bulbs. The ionized hydrogen ions are accelerated by the electromotive force induced within the portion of the ring magnet loop surrounding the core 9b, and the resulting flowing hydrogen ions are confined to the path defined by the ring magnets.

Relatively high frequency energy can be extracted from the flowing hydrogen ion stream by means of a coupling unit generally indicated by reference numerals 67. The coupling unit 67 illustrated comprises a series of parallel conductor wires 69 each approximately one-half wave length long relative to the frequency which it is desired to generate therewithin. The wires are spaced apart a distance which the moving hydrogen ions will advance in a half cycle of the frequency to be generated. The wires 69 are interconnected by short lengths of wire 71 each of which is an odd multiple of a half wave length ($n$) at the frequency involved. A conductor 73 is coupled to the inner end of one of the outer wires 69 to couple energy from the coupling unit 67. The coupling unit 67 in effect acts as a receiving antenna system which extracts energy from the moving ionized hydrogen stream at a frequency dependent upon the velocity of flow of the hydrogen ions and the geometric dimensions of the coupling unit 67.

It should be understood that numerous modifications may be made of the preferred forms of the invention described above without deviating from the broader aspects of the invention.

The expression "a series of magnetic field producing elements" used in some of the claims means, unless other language is inconsistent therewith, either separate magnetic elements as in the embodiment of FIG. 3 or integral parts or sections of an overall integral magnetic structure as in the pair of helical windings of FIG. 7, where the different parts or sections thereof act like or analogous to separate magnetic field producing elements.

What I claim as new and desire to protect by United States Letters Patent is:

1. Apparatus for confining charged particles to a given path comprising: a series of magnetic field producing elements positioned along said given path for providing successive doughnut-like magnetic field sections which at any instant alternate in direction along the path, and means connected to said magnetic field producing elements for imparting motion to said magnetic field sections along said path to subject the charged particles continuously to a rapidly varying, reversing magnetic field pattern which confines the particles to the central portion of the doughnut-like sections thereof.

2. In an apparatus where charged particles move in a given direction relative to a wall surface thereof, the improvement in means for minimizing friction between the particles and the wall surfaces comprising: means for forming a magnetic field pattern along said wall surface which pattern comprises successive magnetic field sections which alternate in direction along said wall surface in the direction of said particle movement, and means connected to said last named means for effecting movement of said magnetic field pattern in a direction opposite to the direction of movement of said gaseous fluids continuously to subject the particles to a rapidly varying and reversing magnetic field.

3. Apparatus for confining non-liquid ionized fluids to a given path comprising: a series of magnetic field producing elements positioned in an irregular manner along said path to provide successive irregularly spaced magnetic field sections which at any instant alternate in direction along the path, and means for imparting and maintaining substantial relative motion between the fluid and the magnetic field sections along said path, the irregular spacing of said magnetic field sections minimizing resonant interaction between the conductive fluid and magnetic field sections.

4. Apparatus for confining non-liquid ionized fluids to a given path comprising: a series of magnetic field producing elements positioned in an irregular manner along said path to provide successive irregularly spaced magnetic field sections along the path which at any instant alternate in direction along the path, each of said magnetic field sections extending substantially longitudinally at the location of ecah element and transversely or radially at points between adjacent elements, the irregular spacing of said magnetic field producing elements minimizing resonant interaction between the ionized fluid and the magnetic field sections.

5. Apparatus for manipulating conductive fluids comprising: a series of magnetic field producing elements positioned along a given path, said magnetic field producing elements comprising a number of series connected helical conductor winding sections encompassing said path, the successive helical winding sections alternating in direction to provide magnetic field sections which alternate in direction along the path, and a source of energizing current connected to the opposite ends of the outer helical winding sections, whereby magnetic field sections are provided which alternate in direction along said path.

6. Apparatus for manipulating conductive fluids along a given path comprising: a source of alternating current of a given frequency, helical conductor winding means along said path, the length of said winding means measured along the lineal extent thereof being many wave lengths at said frequency, and means connecting said source of alternating current to said helical winding means for providing a traveling wave which provides a magnetic field pattern which progresses along said path and continuously moves relative to the fluid, and at any instant comprises successive doughnut-like magnetic field sections which alternate in direction along successive half wave length sections of the helical winding means.

7. Apparatus for confining conductive fluids to the central region of a conduit comprising: a source of energizing voltage, and a helical winding of conductive material encompassing said conduit and connected to said source of energizing voltage to provide successive doughnut-like magnetic field sections which alternate in direction along the conduit.

8. The apparatus of claim 2 wherein the apparatus is a vehicle to be impelled through an ionizable or ionized fluid medium, said device having a nose portion at the front thereof, and said means for forming a magnetic field pattern forming the pattern at the outer surface of the nose portion of said device and which moves towards the tip of the nose portion thereof to increase the relative velocity between the fluid medium and the device.

9. In combination with a rocket motor having a combustion chamber in which fuel is burned, a rear gas discharge orifice and a passageway connecting said combination chamber with said discharge orifice, means for confining the flow of gases along a given path between said combustion chamber and said discharge orifice comprising means for providing a forwardly traveling magnetic field pattern along said path.

10. In combination with a rocket motor having a combustion chamber in which fuel in burned, a rear gas discharge orifice and a passageway connecting said combustion chamber with said discharge orifice, means for confining the flow of gases along a given path between said combustion chamber and said discharge orifice comprising means for providing a magnetic field pattern along said path which comprises successive magnetic field sections which alternate in direction along said path.

11. In combination with a rocket motor having a combustion chamber in which fuel is burned, a rear gas discharge orifice and a passageway connecting said combustion chamber with said discharge orifice, means for confining the flow of gases along a given path between said combustion chamber and said discharge orifice comprising means for providing a forwardly traveling magnetic field pattern along said path which moves toward the combustion chamber end of said passageway and at any instant comprises successive magnetic field sections which alternate in direction along said path.

References Cited by the Examiner

UNITED STATES PATENTS

| | | | |
|---|---|---|---|
| 2,021,519 | 11/1935 | Polin. | |
| 2,604,936 | 7/1952 | Kaehni. | |
| 2,698,127 | 12/1954 | Bowlus | 230—1 |
| 2,715,190 | 8/1955 | Brill | 310—11 |

(Other references on following page)

UNITED STATES PATENTS

| | | | |
|---|---|---|---|
| 2,753,469 | 7/1956 | Statham | 310—11 |
| 2,838,001 | 6/1958 | Robinson | 103—1 |
| 2,847,607 | 8/1958 | Pierce | 315—3.5 |
| 2,936,711 | 5/1960 | Watt | 103—1 |
| 2,946,541 | 7/1960 | Boyd | 244—42.41 |
| 2,952,970 | 9/1960 | Blackman | 60—35.5 |
| 2,992,345 | 7/1961 | Hansen. | |
| 3,041,824 | 7/1962 | Berhman | 60—35.5 |
| 3,054,015 | 9/1962 | Fujii | 315—3.5 |
| 3,059,149 | 10/1962 | Salisbury | 313—63 |
| 3,138,019 | 6/1964 | Fonda-Bonardi | 60—35.5 |
| 3,138,919 | 6/1964 | Deutsch | 60—35.5 |

OTHER REFERENCES

"Propulsion Systems for Space Flight," 1960, pages 215–222.

MARK NEWMAN, *Primary Examiner.*

JULIUS E. WEST, SAMUEL LEVINE, *Examiners.*

D. J. BARNARD, C. R. CROYLE, *Assistant Examiners.*